US010747275B2

(12) United States Patent
Sanders et al.

(10) Patent No.: US 10,747,275 B2
(45) Date of Patent: Aug. 18, 2020

(54) ACCESS TO HIGH FRAME-RATE RADAR DATA VIA A CIRCULAR BUFFER (71) Applicant: Google LLC, Mountain View, CA (US)

(72) Inventors: Jason P. Sanders, New York, NY (US); Gabriel O. Taubman, Brooklyn, NY (US)

(73) Assignee: Google LLC, Mountain View, CA (US)

(*) Notice: Subject to any disclaimer, the term of this patent is extended or adjusted under 35 U.S.C. 154(b) by 219 days.

(21) Appl. No.: 15/711,824

(22) Filed: Sep. 21, 2017

(65) Prior Publication Data
US 2019/0086971 A1 Mar. 21, 2019

(51) Int. Cl.
G06F 1/16 (2006.01)
G06F 3/01 (2006.01)
G06F 3/0346 (2013.01)
G06F 3/0488 (2013.01)
G06F 5/10 (2006.01)
G06F 9/54 (2006.01)

(52) U.S. Cl.
CPC ............ *G06F 1/1694* (2013.01); *G06F 3/017* (2013.01); *G06F 3/0346* (2013.01); *G06F 3/0488* (2013.01); *G06F 5/10* (2013.01); *G06F 9/544* (2013.01); *G06F 2200/1637* (2013.01); *G06F 2203/0339* (2013.01); *H04M 2250/12* (2013.01); *H04M 2250/22* (2013.01)

(58) Field of Classification Search
CPC ........... G06F 5/10; G06F 9/544; G06F 1/1694
See application file for complete search history.

(56) References Cited

U.S. PATENT DOCUMENTS

| 5,606,707 A | * | 2/1997 | Tomassi | G06F 9/3877 345/418 |
| 5,699,067 A | * | 12/1997 | Brown | G01S 7/066 342/176 |
| 2008/0072005 A1 | | 3/2008 | Abdelilah et al. | |
| 2011/0291875 A1 | * | 12/2011 | Szajnowski | G01S 7/023 342/70 |
| 2013/0091379 A1 | * | 4/2013 | Taveniku | G06F 11/1469 714/6.3 |

(Continued)

FOREIGN PATENT DOCUMENTS

WO 2019060114 3/2019

OTHER PUBLICATIONS

"International Search Report and Written Opinion", PCT Application No. PCT/US2018/048585, dated Mar. 13, 2019, 15 pages.

(Continued)

*Primary Examiner* — Marc Anthony Armand
(74) *Attorney, Agent, or Firm* — Colby Nipper PLLC (57) ABSTRACT Techniques and devices for access to high frame-rate radar data via a circular buffer are described. In some implementations, a radar sensor collects radar data regarding objects detected by a radar field and stores the data to a circular buffer. A data manager monitors the circular buffer and processes data requests from multiple applications. Through use of the described techniques and devices, the multiple applications can efficiently access the requested radar frame data from the circular buffer, reducing both memory requirements and processor resource usage associated with providing the requested data.

20 Claims, 9 Drawing Sheets (56) References Cited

U.S. PATENT DOCUMENTS

| | | |
|---|---|---|
| 2013/0268736 A1 | 10/2013 | Okamoto et al. |
| 2013/0285969 A1 | 10/2013 | Raffa et al. |
| 2015/0116695 A1 | 4/2015 | Bartolome et al. |
| 2017/0206169 A1* | 7/2017 | Coppola ............. G06F 9/44505 |
| 2018/0300964 A1* | 10/2018 | Lakshamanan ........ G07C 5/008 |
| 2019/0193748 A1* | 6/2019 | Fukumoto ............ B60W 50/06 |

OTHER PUBLICATIONS

Yan, et al., "Real-Time Sensing on Android", The 12th International Workshop on Java Technologies for Real-time and Embedded Systems, At Buffalo, Oct. 13, 2014, 9 pages.

"EP Appeal Decision", European Application No. 10194359.5, May 28, 2019, 20 pages.

"Galaxy S4 Air Gesture", Galaxy S4 Guides, https://allaboutgalaxys4.com/galaxy-s4-features-explained/air-gesture/, 4 pages.

"Samsung Galaxy S4 Air Gestures", Video from https://www.youtube.com/watch?v=375Hb87yGcg, May 7, 2013.

\* cited by examiner

ACCESS TO HIGH FRAME-RATE RADAR DATA VIA A CIRCULAR BUFFER

BACKGROUND

Applications that use high frame-rate radar data are becoming more common. For example, radar sensors can be used to detect gestures, to map an environment, or to improve the performance of non-radar sensors. The usefulness of high frame-rate radar sensors creates environments in which multiple applications require more, and different types of, radar data (e.g., raw or minimally processed radar data, digital in-phase and quadrature data, range-Doppler data, and so forth). Currently, to provide multiple applications with radar data from a single radar sensor, the applications access the data using time-sharing techniques that allow each application a predefined time to get the particular data it uses. In other cases, each application has a dedicated radar sensor that provides the requested data. In either case, the radar sensor typically collects that data according to a request from the application and stores the data in a memory location that the application or applications have access to as needed. These techniques thus require extra memory and/or sensors, and consume additional processing resources to manage the data requests. Further, in some situations, an application such as a user interface may need access to real-time radar data, which requires more processing resources to manage requests for real-time data in time-sharing situations.

SUMMARY

This document describes techniques for, and systems that enable, access to high frame-rate radar data via a circular buffer. The techniques provide a radar sensor, a circular buffer, and a data manager. The radar sensor writes high frame-rate radar data (as radar data frames) to the circular buffer, which serves as a common memory location for multiple applications that use the radar data frames. The data manager monitors the circular buffer, manages data requests from the multiple applications, and determines whether a radar data frame stored in the circular buffer corresponds to the requested data. When a data frame corresponds to a request, the data manager sends a notification, including the memory address of the corresponding radar data frame, to the requesting application. The application can then read the radar data frame before it is overwritten in the circular buffer. In this way, multiple applications can access radar data frames stored in a single memory location, which reduces both memory requirements and processor resource usage.

This summary is provided to introduce simplified concepts concerning access to high frame-rate radar data via a circular buffer, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and systems for access to high frame-rate radar data via a circular buffer are described with reference to the following drawings. The same numbers are used throughout the drawings to reference like features and components.

DETAILED DESCRIPTION

Overview

This document describes techniques for, and devices enabling, access to high frame-rate radar data via a circular buffer. The techniques provide a common memory location for radar data and a data manager that can process data requests from multiple applications and enable access to the requested data for each application.

Consider, for example, a system that includes multiple radar sensors that collect radar data at a high frame-rate and multiple applications with different requirements for using the radar data. In this example, one application may use radar data only for a particular radar location (e.g., a particular combination of azimuth, elevation, and range). Another application may only use data regarding non-moving objects with a large radar cross section. Still another application may require radar data that provides a minimum azimuth, elevation, range, and Doppler resolution for high accuracy measurements. Other applications may require targets to meet a predefined minimum signal-to-noise ratio to minimize false-alarms and influences from environmental clutter and noise.

Conventional techniques typically dictate that individual radar sensors write their data to a separate memory, and the applications then search that memory for the data that matches their requirements. Because the radar sensors are constantly collecting data at a high frame-rate, the memory requirements increase rapidly. Additionally, the large number of data operations required for the current techniques, such as writing the data to the memory, consume processor resources that could be used for other tasks. Further, the applications must search and filter the data to find the data that meets the applications' particular requirements, again using processor resources and slowing data acquisition.

Contrast these conventional techniques for storing and accessing radar data with the systems and techniques described in this document, which improve efficiency in several areas. For example, the circular buffer can be implemented as a page-locked memory (e.g., pinned memory), which allows the radar sensors to write data to a fixed number of physical memory addresses. This reduces the processor resources required to write data and also improves transfer speed. Further, because it is a circular buffer, the size of the memory is constant and can be set by the users, which reduces the overall memory requirements. Additionally, the data manager reduces the processor resources required by the application to determine and read the data relevant to the application.

These are but a few examples of how the techniques and devices described herein may improve access to high frame-rate radar data. Other examples and implementations of which are described throughout this document. The document now turns to an example environment, after which example apparatuses, methods, and components are described.

Example Environment

Figure 1:
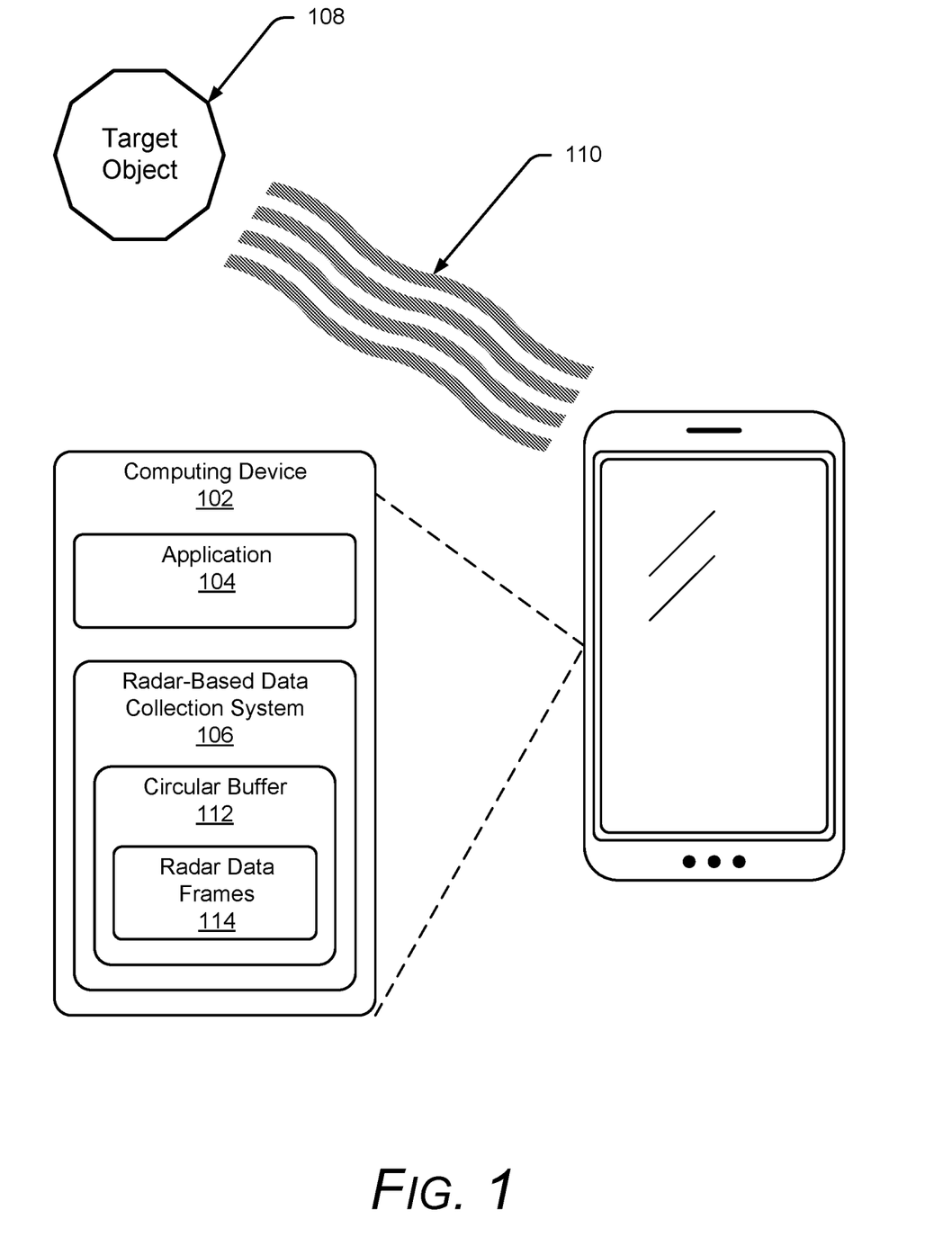
FIG. 1 illustrates an example environment in which techniques enabling access to high frame-rate radar data via a circular buffer can be implemented.

FIG. 1 illustrates an example environment in which techniques enabling access to high frame-rate radar data via a circular buffer can be implemented. The example environment 100 includes a computing device 102 having an application 104 and a radar-based data collection system 106. The radar-based data collection system 106 represents functionality that can wirelessly capture high frame-rate radar data that describes various characteristics of a target object 108. For example, the radar-based data collection system 106 can use radar signals 110 to wirelessly sense, detect, and recognize the size, shape, position, velocity, and other characteristics of the target object 108. The target object 108 is an entity about which the radar-based data collection system 106 is collecting data. Thus, the target object 108 may be a physical object or a gesture. For example, the target object 108 may be a chair, a person, or a gesture being made by a person. The radar-based data collection system 106 includes a circular buffer 112 that can store the high frame-rate radar data as radar data frames 114. The circular buffer 112 is a memory that is accessible by the application 104 or other components of the computing device 102. The implementations and uses of the radar-based data collection system 106, the circular buffer 112, and/or the radar data frames 114 may vary, and are described throughout this document.

The application 104 may be any application that uses the radar data captured by the radar-based data collection system 106 to perform various operations. The radar signals 110 generally represent one or more radio frequency (RF) signals transmitted and received by radar-based data collection system 106. In some implementations, the radar-based data collection system 106 emits a radar field or signal using a single antenna that is directed towards the target object 108. In other implementations, multiple radar signals are transmitted, each on a respective antenna. As a transmitted signal reaches the target object 108, at least a portion of the transmitted signal reflects back to the radar-based data collection system 106 and is processed, as further described below. In this example environment, computing device 102 is illustrated as a mobile device, but it is to be appreciated that this is merely for discussion purposes, and that other devices can be utilized without departing from the scope of the claimed subject matter.

The radar signals 110 can have any suitable combination of power, carrier frequency, burst periodicity, pulse width, modulation type, waveform, phase relationship, and so forth. Some or all of the respective signals transmitted in the radar signals 110 may differ from one another to create a specific diversity scheme. Example diversity schemes include a time diversity scheme that transmits multiple versions of a same signal at different points in time, a frequency diversity scheme that transmits signals using several different frequency channels, or a space diversity scheme that transmits signals over different propagation paths. In some implementations, the configuration of the radar signals 110, as well as how reflected signals are processed by the radar-based data collection system 106, can be dynamically configured, controlled, or influenced by a user of the computing device 102 or by the application 104.

Figure 2:
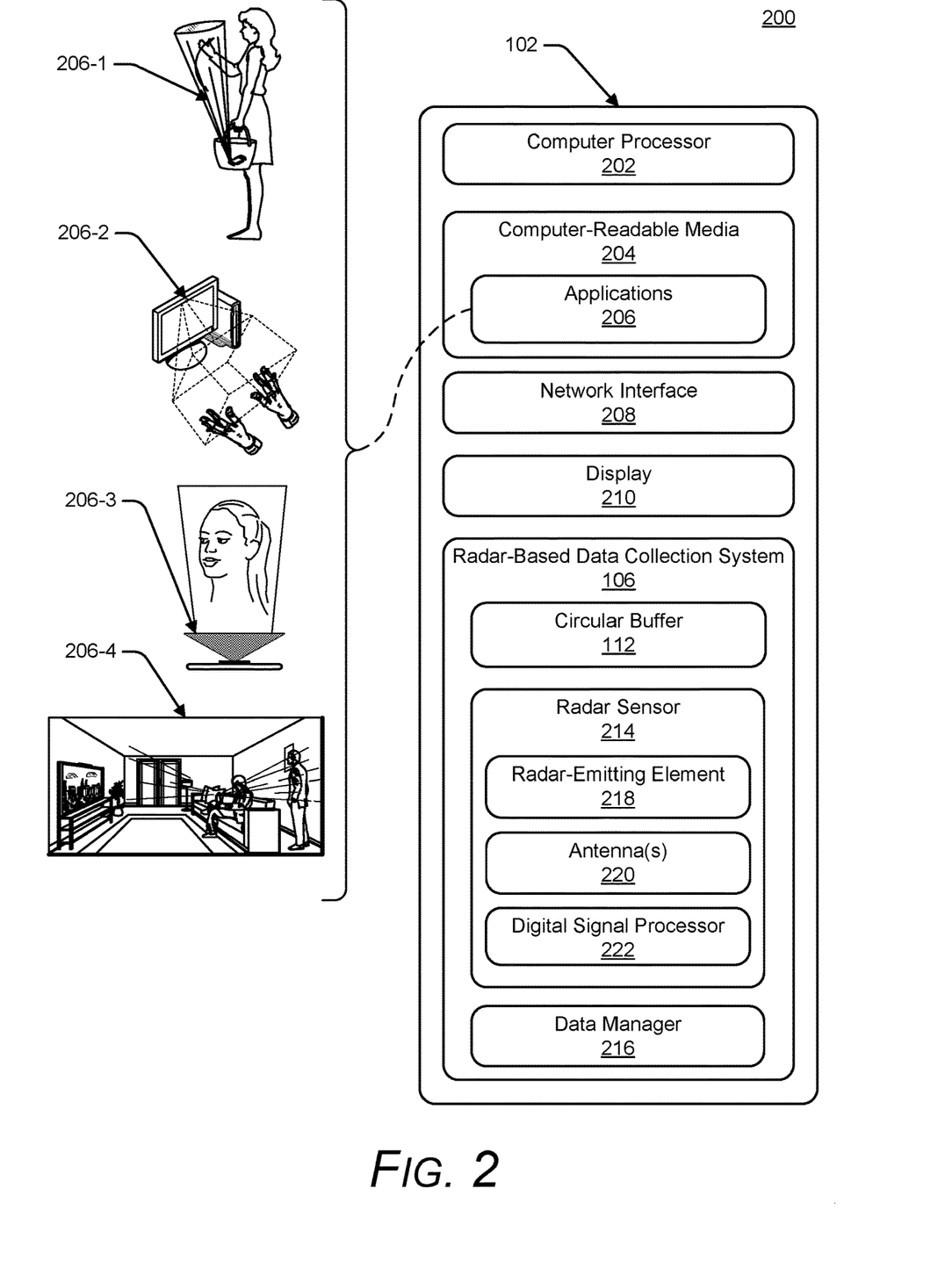
FIG. 2 illustrates an example implementation of the computing device of FIG. 1 that can implement access to high frame-rate radar data via a circular buffer.

Having generally described an environment in which access to high frame-rate radar data via a circular buffer may be implemented, now consider FIG. 2, which illustrates an example implementation 200 of the computing device 102 of FIG. 1. In the example implementation 200, the computing device 102 includes the radar-based data collection system 106, additional details of which are described throughout this document. In other implementations, the radar-based data collection system 106 may operate as a separate system that is communicatively connected to the computing device 102.

The computing device 102 may be any of a variety of devices, such as a smartphone, a tablet, a laptop computer, a desktop computer, or a server. The computing device 102 includes one or more computer processors 202 and computer-readable media 204, which includes memory media and storage media. An operating system (not shown) and one or more applications 206, which may include or be implemented similar to the application 104 as described with reference to FIG. 1, may be embodied as computer-readable instructions on the computer-readable media 204. The applications 206 and/or the operating system can be executed by the computer processors 202 to enable various functionalities of the computing device 102.

Various non-limiting examples of the applications 206 are also illustrated in FIG. 2 as example applications 206-1 through 206-4. As shown in FIG. 2, the example application 206-1 is a gesture recognition application for an occluded gesture system, which enables a device that is, for example, being carried in a purse, to detect gestures made outside the purse. The example application 206-2 is implemented as part of a radar-based gesture recognition system, which provides a radar field (shown as a dashed-line cube) in which a user may interact with a computing device by making gestures within the radar field. The example application 206-3 is implemented as part of a medical diagnostic system that uses radar to measure physiological characteristics or assess abnormal body movements, such as a facial twitch, which can aid in diagnosing various medical conditions (e.g., a stroke or symptoms of Parkinson's disease). The example applications also include a mapping application 206-4, which can be used to identify a three-dimensional context map of a space for configuring and using contextual awareness settings of the computing device 102.

The computing device 102 may also include a network interface 208 and a display 210. The network interface 208 may communicate data over any of a variety of wired, wireless, or optical networks. For example, the network interface 208 may communicate over a local-area-network (LAN), a wireless local-area-network (WLAN), a personal-area-network (PAN), a wide-area network (WAN), an intranet, the Internet, a peer-to-peer network, point-to-point network, or a mesh network. The display 210 can be integrated with the computing device 102 or associated with it (e.g., as a separate monitor for a desktop computer). The display 210 can display information, data, status reports, or any of a variety of user interfaces that allow a user to modify, control, or otherwise interact with the operation of the computing device 102.

In this example, the radar-based data collection system 106 of the computing device 102 includes a circular buffer 112, a radar sensor 214, and a data manager 216. The circular buffer 112 may be implemented as, or similar to, the circular buffer 112 described in reference to FIG. 1 or otherwise herein. The components of the radar-based data collection system 106 may be integrated as a single apparatus or operate as separate components that are communicatively coupled with each other. The radar-based data collection system 106 can collect and store the radar data frames 114 from one or more sources of radar data, such as radar sensor 214. The radar-based data collection system 106 may also enable access to the radar data frames 114 stored in the circular buffer 112 by the one or more applications 206. For example, the radar sensor 214 can write the multiple radar data frames 114 to the circular buffer 112, which receives and stores the multiple radar data frames 114 in accordance with various implementations. Once stored in the circular buffer 112, the data manager 216 can enable access to the multiple radar data frames 114 by the one or more applications 206, as described herein.

In some implementations, the circular buffer 112 is configured as a region or partition of a random access memory (RAM) that can store multiple radar data frames 114. The circular buffer 112 may include radar data frames received from the radar sensor 214 or from multiple different radar sensors. The radar data frames may include any suitable type of radar data, such as digital in-phase and quadrature data (I/Q data) or range-Doppler data. Additional details of the multiple radar data frames 114 are described with reference to FIG. 3.

Generally, a circular buffer, such as circular buffer 112, is a memory buffer of a pre-configured size (e.g., fixed size) that is written to in sequential order (a circular buffer is also known as a ring buffer). For instance, in an example buffer with ten storage addresses, data is written to the addresses sequentially, starting with a first address (e.g., "1, 2, 3 . . . 8, 9, 10" or "9, 10, 1 . . . 6, 7, 8"). When all of the addresses have been written to, the next data to be written is stored in the original first address, overwriting whatever data was previously written in that location (in the previous example sequences, the first addresses are "1" and "9"). The circular buffer 112 may be provided by the operating system, or a memory controller (not shown), of the computing device 102 that manages the RAM or other memory. For example, the operating system of the computing device 102 may allocate a pinned region of RAM to be the circular buffer. Alternately or additionally, a circular buffer may be provided by another device or service, such as a server or cloud-based service.

The circular buffer 112 may be a pinned memory, which is a page-locked memory that cannot be paged out of physical memory and cannot be reclaimed/reallocated by the operating system under normal system operation. In some implementations, the circular buffer 112 is, or includes, a multi-port memory that allows simultaneous read-access by multiple applications and/or devices. For example, the RAM region provided by the device or service to serve as the circular buffer 112 may itself be a multi-port memory. In other cases, the radar data frames 114 may be transferred to a separate multi-port circular buffer for access (e.g., concurrent access) by the multiple applications and/or devices.

The radar sensor 214 represents functionality that wirelessly detects targets through the transmission and reception of RF or radar signals. The radar sensor 214 can write multiple radar data frames 114 to a memory, such as the circular buffer 112. The radar sensor 214 can be implemented as a system and/or radar-enabled component embedded within the computing device 102, such as a system-on-chip (SoC) or sensor-on-chip. It should be noted, however, that the radar sensor 214 can be implemented in any other suitable manner. For example, the radar sensor 214 may be implemented as: one or more integrated circuits (ICs), a processor with embedded processor instructions (or configured to access a memory on which processor instructions are stored), a hardware element with embedded firmware, a printed circuit board assembly with various hardware components, or as any combination thereof. Here, the radar sensor 214 includes a radar-emitting element 218, one or more antenna(s) 220, and a digital signal processor (DSP or digital signal processing component) 222, which can be used in concert to wirelessly detect various types of targets in the environment of the computing device 102.

Generally, radar-emitting element 218 is configured to provide a radar field. The radar field may be configured to at least partially reflect off one or more target objects. In some cases, the target objects may include a user of the computing device 102 or other people present in the environment of the computing device 102. In other cases, the target objects include physical attributes of the user, such as hand motion, breathing rates, or other physiological features.

The radar field that is produced may be any of a variety of radiation fields, including a wide field, a narrow field, a shaped field (e.g., a hemisphere, a cube, a fan, a cone, or a cylinder), a steered field, an un-steered field, a close range field, or a far range field. Additionally, the radar-emitting element 218 may use a continuous-wave signal or pulsed-Doppler signal and use any of a variety of frequencies, update rates, pulse widths, interpulse periods (IPP), transmit powers, and modulations. A radar field provided by the radar-emitting element 218 can be a small size, such as zero or one millimeters to 1.5 meters, or an intermediate size, such as one to 30 meters. It is to be appreciated that these sizes are merely for discussion purposes, and that any other suitable size or range of radar field can be used. For example, when the radar field has an intermediate size, the radar sensor 214 can be configured to receive and process reflections of the radar field to provide large-body gestures based on reflections from human tissue caused by body, arm, or leg movements. In some aspects, the radar field can be configured to enable the radar sensor 214 to detect smaller and more-precise gestures, such as micro-gestures.

The radar sensor 214 detects nearby targets by transmitting radio waves and receiving reflected radio waves, as described below with reference to the antennas 220. The radio waves are invisible and may be designed to penetrate various materials (e.g., wood, glass, plastic, textiles, or nylon) and reflect from other materials, such as human tissue and skin. The radar sensor 214 can also compute a three dimensional position and velocity of the targets, as described below with reference to the DSP 222.

The antenna(s) 220 transmit and receive RF signals of the radar sensor 214. In some cases, the radar-emitting element 218 is coupled with the antennas 220 to transmit a radar field. As one skilled in the art will appreciate, this is achieved by converting electrical signals into electromagnetic waves for transmission, and vice versa for reception. The radar sensor 214 can include one or an array of any suitable number of antennas in any suitable configuration. For instance, any of the antennas 220 can be configured as a dipole antenna, a parabolic antenna, a helical antenna, a planar array, an inverted-F antenna, a monopole antenna, and so forth. In some embodiments, the antennas 220 are constructed or formed on-chip (e.g., as part of a SoC), while in other implementations, the antennas 220 are separate components, metal, dielectrics, hardware, etc. that attach to, or are included within, the radar sensor 214.

In some implementations of the radar sensor 214, the antenna 220 can be single-purpose (e.g., a first antenna 220 can be directed towards transmitting signals, and a second antenna 220 can be directed towards receiving signals). In other implementations, the antenna 220 can be multi-purpose (e.g., a single antenna 220 directed toward both transmitting and receiving signals). Thus, varying combinations of the antennas 220 may be used, such as an implementation that utilizes two single-purpose antennas 220 configured for transmission in combination with four single-purpose antennas 220 configured for reception or an implementation that utilizes a single antenna 220 configured to transmit and receive. The placement, size, and/or shape of the antennas 220 can be chosen to enhance a specific transmission pattern or diversity scheme, such as a pattern or scheme designed to capture information about the environment, as further described herein.

The antennas 220 can be physically separated from one another by a distance that allows the radar sensor 214 to collectively transmit and receive signals directed to a target object over different channels, different radio frequencies, and different distances. In some implementations, the antennas 220 may be spatially distributed to support triangulation techniques, while in other implementations, the antennas 220 are collocated to support beamforming techniques. While not illustrated, each antenna 220 can correspond to a respective transceiver path that physically routes and manages the outgoing signals for transmission and the incoming signals for capture and analysis.

The DSP 222 generally represents functionality for performing operations related to digitally processing the radar signal and generating radar data based on the radar signal. For instance, the DSP 222 can process the radar signal using techniques such as digital beamforming, Doppler filtering, noise estimation, clutter cancellation, and target detection. Through these techniques, the DSP 222 can generate the radar data that includes raw or minimally processed radar data, digital in-phase and quadrature data, range-Doppler data, and so forth.

In some cases, the DSP 222 further processes the radar data to provide a radar feature that characterizes the radar data. For example, the DSP 222 can determine the number of targets detected, the signal-to-noise ratio of these targets, as well as characteristics of the clutter detected (e.g., amplitude, doppler frequencies, range, azimuth, elevation). The DSP 222 can also describe target characteristics, position, or dynamics by measuring a range, an azimuth, an elevation, radial velocity, and/or radar cross section of the target. The DSP 222 can further compute a three dimensional position and velocity of the targets. The DSP 222 can also include tracking functionality that predicts future positions and velocities of the targets based on the measurements. Using the predicted positions and velocities of the target, the DSP 222 can automatically determine future radiation pattern characteristics to increase a probability of detecting the target.

Further, the DSP 222 can be used to control the configuration of signals generated and transmitted by the radar-emitting element 218 and/or antennas 220, such as configuring a plurality of signals to form a specific diversity or beamforming scheme. In some cases, the DSP 222 receives input configuration parameters that control an RF signal's transmission parameters (e.g., frequency and/or power level), such as through the data manager 216. In turn, the DSP 222 modifies the RF signal based upon the input configuration parameter. At times, the signal processing functions of the DSP 222 are included in a library of signal processing functions or algorithms that are also accessible and/or configurable via the applications 206 or an application programming interface (API). The DSP 222 can be implemented in hardware, software, firmware, or any combination thereof.

The DSP 222 can write the radar data in a memory, such as the circular buffer 112, as multiple radar data frames 114. The radar data frame 114 is associated with a time period beginning when a particular signal is sent and ending with the return signal is received. Thus, the radar data frame 114 contains the data collected on, or based on, the particular return signal, including the raw or minimally processed data such as I/Q and range-Doppler data. The DSP 222 may write radar data frames at various frame rates coinciding with the rate at which the radar signals are transmitted and received. For example, the DSP 222 may write a new radar data frame every 100 microseconds or every 100 milliseconds. Such frame rates of approximately 100 microseconds to 100 milliseconds may be referred to as high frame rates of radar data frames, which may be suitable for capturing very fast motions, high level of detail, or fine details of user gesture (e.g., micro-gestures).

As noted above, the circular buffer 112 may be a pinned memory, such as a portion of RAM or other memory of the computing device 102. Using a pinned memory allows the DSP 222 to use the physical RAM address, rather than the virtual address, of the buffer for writing radar data frames 114. In turn, the physical address allows the DSP 222 to write the radar data frames 114 to the circular buffer 112 using direct memory access (DMA). DMA operations of the pinned memory may be implemented through a memory controller (e.g., DMA-enabled controller) or memory manager that is separate from a processor of the computing device 102. Thus, data write (or read) operations implemented via DMA consume less processor resources of the computing device 102 and/or the DSP 222, freeing the processor for other tasks and lowering overall power usage by the application.

Figure 3:
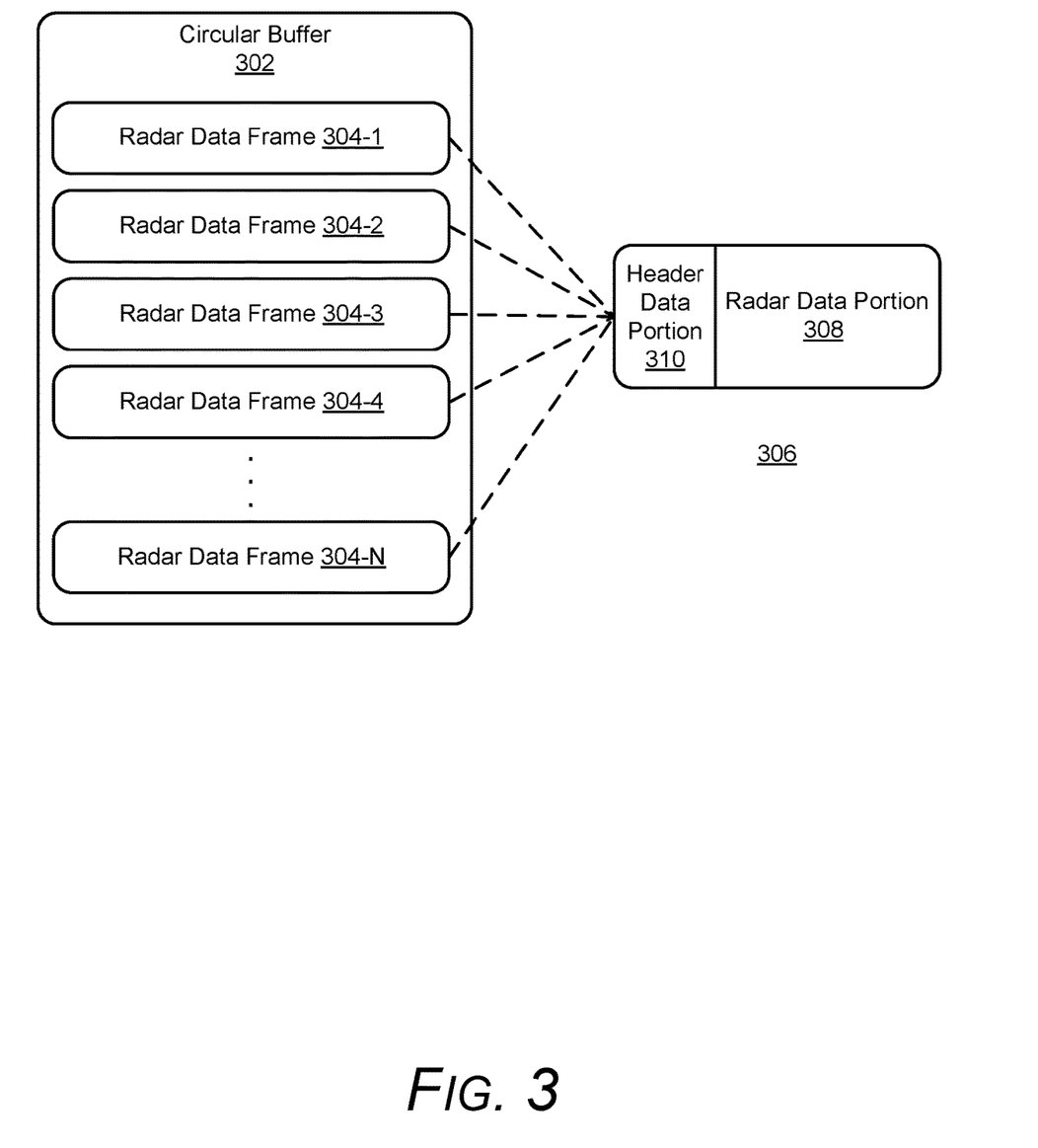
FIG. 3 illustrates an example circular buffer storing multiple radar data frames.

In addition to the radar data, the DSP 222 may write radar data frames 114 that also contain other information about the radar sensor and/or the radar data. FIG. 3 illustrates an example implementation 302 of a circular buffer 112 that includes multiple radar data frames 304-1 through 304-N. A detail view at 306 shows that each of the radar data frames 304 may include both a radar data portion 308 and a header data portion 310. The radar data portion 308 includes the radar data as described herein (e.g., I/Q data, range-Doppler data, or data related to target characteristics). The header data portion 310 may include any of a variety of information about the radar data or the radar sensor that collected the data. For example, the header data portion 310 may include a time stamp, information regarding the radar sensor that collected the data (e.g., position, configuration), a type of radar signal (e.g., frequency, IPP, modulation, beamforming angle), one or more of the characteristics of the radar data mentioned above, the input configuration parameter mentioned above, or a type of radar data (e.g., I/Q data, range-Doppler data, target characteristics).

Returning to FIG. 2, the data manager 216 represents functionality that enables access to the multiple radar data frames 114 by one or more of the applications. The data manager 216 may be implemented as a system, sub-system, and/or radar-enabled component embedded within the computing device 102, such as a system-on-chip (SoC). It should be noted, however, that the data manager 216 can be implemented in any other suitable manner or combination of components described herein. For example, the data manager 216 may be implemented as one or more integrated circuits (ICs), a processor with embedded processor instructions (or configured to access a memory on which processor instructions are stored), a hardware element with embedded firmware, a printed circuit board assembly with various hardware components, or as any combination thereof.

Figure 4:
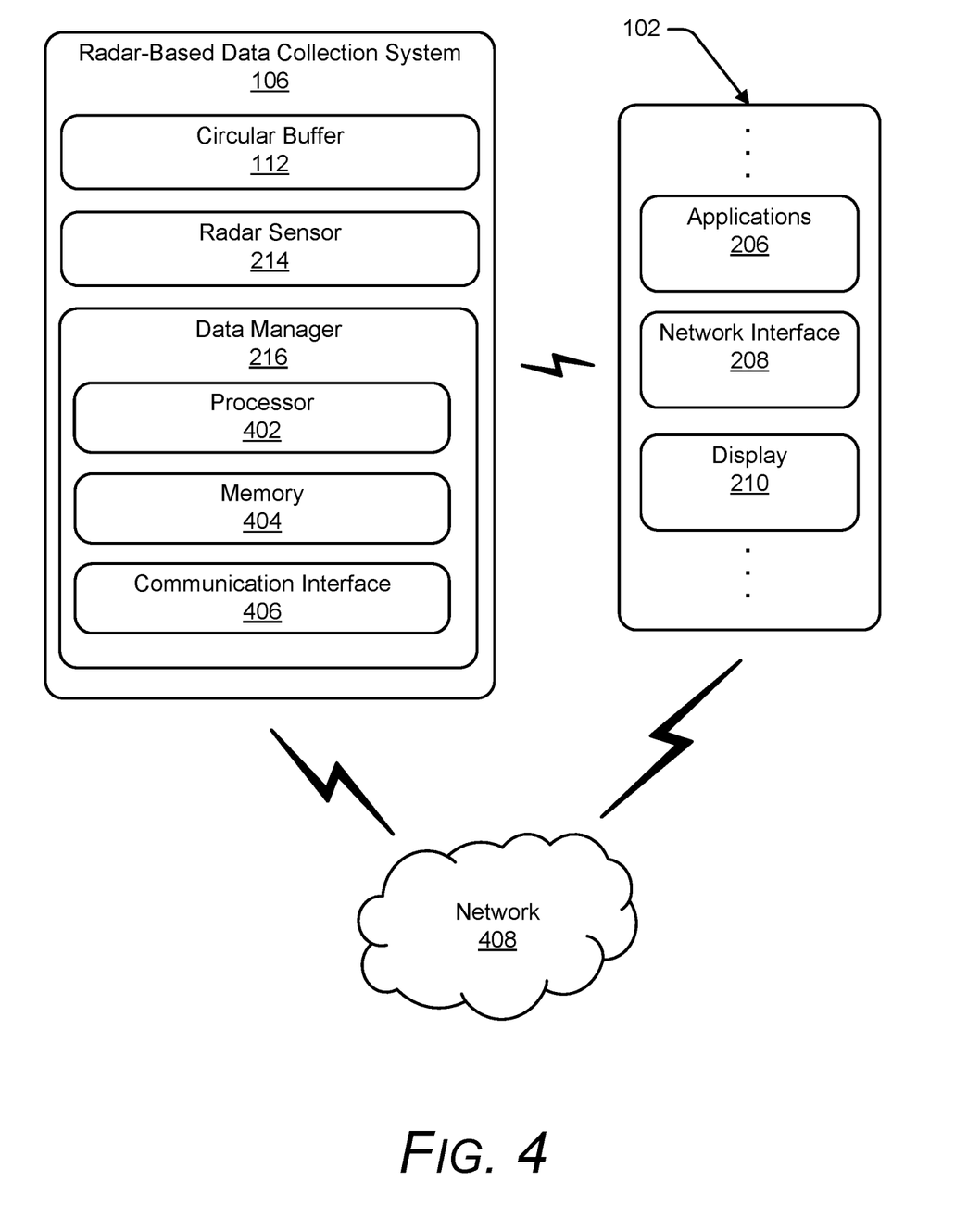
FIG. 4 illustrates an example data manager that enables access to the circular buffer.

Consider FIG. 4, which illustrates an example implementation 400 of the data manager 216 of the radar-based data collection system 106. As shown in FIG. 4, the radar-based data collection system 106 is separate from the computing device 102. In other implementations, the radar-based data collection system 106 may be integrated with the computing device 102 to provide the functionality described herein in a single device. In the example implementation 400, the data manager 216 includes a processor 402, a memory 404, and a communication interface 406, which can be used in concert to enable multiple applications 206 to access radar data frames stored on the circular buffer 112. The processor 402 represents functionality that enables the data manager 216 to receive data requests from the multiple applications 206 that utilize radar data, process the data requests, and enable the applications 206 to access requested data.

The memory 404 is a memory that the processor 402 and/or the communication interface 406 may use to store information about data requests, to access information about the multiple applications 206, or for other purposes related to performing the functions of the data manager 216 as described herein. The communication interface 406 allows communication between the data manager 216 and other components of the computing device 102, including the applications 206, the network interface 208, and the display 210. In some implementations, the communication interface 406 may also communicate data over any of a variety of wired, wireless, or optical networks 408 (illustrated as a cloud in FIG. 4), such as a local-area-network (LAN), a wireless local-area-network (WLAN), a personal-area-network (PAN), a wide-area network (WAN), an intranet, the Internet, a peer-to-peer network, point-to-point network, or a mesh network. The network 408 may provide communication functions between the radar-based data collection system 106 and the computing device 102. The network 408 may also host one or more functions of the radar-based data collection system 106 (e.g., by providing processor resources or a memory allocation).

Example Methods

Figure 5:
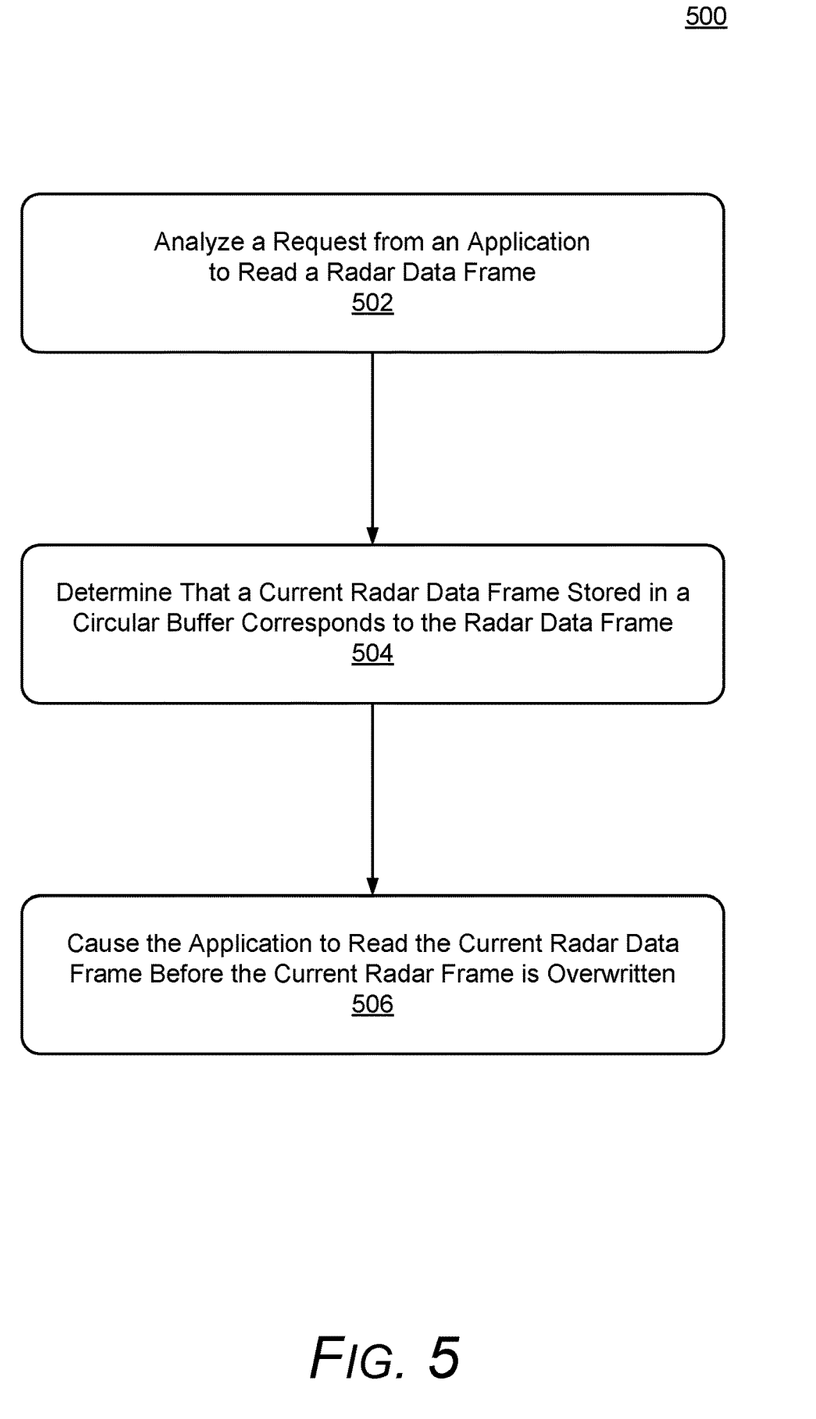
FIG. 5 illustrates an example method enabling access to high frame-rate radar data via a circular buffer.

FIG. 5 depicts an example method 500 that enables access to high frame-rate radar data via a circular buffer. The example method 500 is shown as a set of blocks that specifies operations performed but is not necessarily limited to the order or combinations shown for performing the operations by the respective blocks. Further, any of one or more of the operations may be repeated, combined, reorganized, or linked to provide a wide array of additional and/or alternate methods. In portions of the following discussion, reference may be made to the example environment 100 of FIG. 1 and/or to entities or processes detailed in FIGS. 2-4, reference to which is made for example only. The techniques are not limited to performance by one entity or multiple entities operating on one device.

At 502, a request from an application to read a radar data frame is analyzed. The analysis may be performed by any of a variety of devices, such as the data manager 216 described above. The request may include specific requirements for the requested radar data frame. For example, the request may include a characteristic of the radar data frame. The characteristic of the radar data frame can be related to various aspects of the data, including how the radar data frame was collected, such as the type of radar or the sampling rate. In other cases, the characteristic may be related to information in the header data portion 310 of the requested radar data frame as described with reference to FIG. 3, or to various properties of the data itself, such as a target range, a target Doppler, or a signal-to-noise ratio. The request may also include a request for a latest radar data frame written to the circular buffer. Thus, the request may be for any data frame with a certain characteristic, or for the latest radar data frame that has been written, or for the latest radar data frame that includes the characteristic, and so forth.

Analyzing the request may include any of a variety steps, such as determining a timing window for the radar data frame, determining a radar data frame interval for the radar data frame, or determining a group of consecutive radar data frames. The timing window is a time interval during which the application requires the radar data frame (e.g., an application could request a radar data frame written during a timing window that begins at a particular time and last for 100 microseconds, 200 microseconds, or 300 milliseconds). Determining the timing window allows the data manager 216 to determine that a radar data frame is associated with the request by the application. The radar data frame interval is a time interval between radar data frames that the application requests. For example, even though a new radar data frame may be available every millisecond (or faster), the application may request a radar data frame every minute, every hour, or every 30 milliseconds.

At 504, it is determined that a current radar data frame stored in a circular buffer corresponds to the radar data frame that the application requested to read (this step may be referred to as "determining correspondence"). The determination may be performed by any of a variety of devices, such as the data manager 216 described above. In some implementations, determining that the current radar data frame stored in the circular buffer corresponds to the radar data frame is performed after receiving an interrupt indicating a writing of the current radar data frame to the circular buffer (e.g., the circular buffer 112) is complete. For example, as part of the DMA writing process, the radar sensor 214 may send an interrupt signal to the data manager 216 to notify the data manager 216 that a particular radar data frame has been written.

Determining correspondence may include determining various aspects of how a current radar data frame corresponds to a requested radar data frame, such as determining that a characteristic of the current radar data frame corresponds to the characteristic of the requested radar data frame (as described above) or determining that the current radar data frame is the latest radar data frame written to the circular buffer. Other aspects of determining correspondence may include determining that a time of the current radar data frame is within the timing window for the requested radar data frame, determining that the current radar data frame occurs at the radar data frame interval, or determining that the current radar data frame is one radar frame of the group of consecutive radar data frames.

Figure 6:
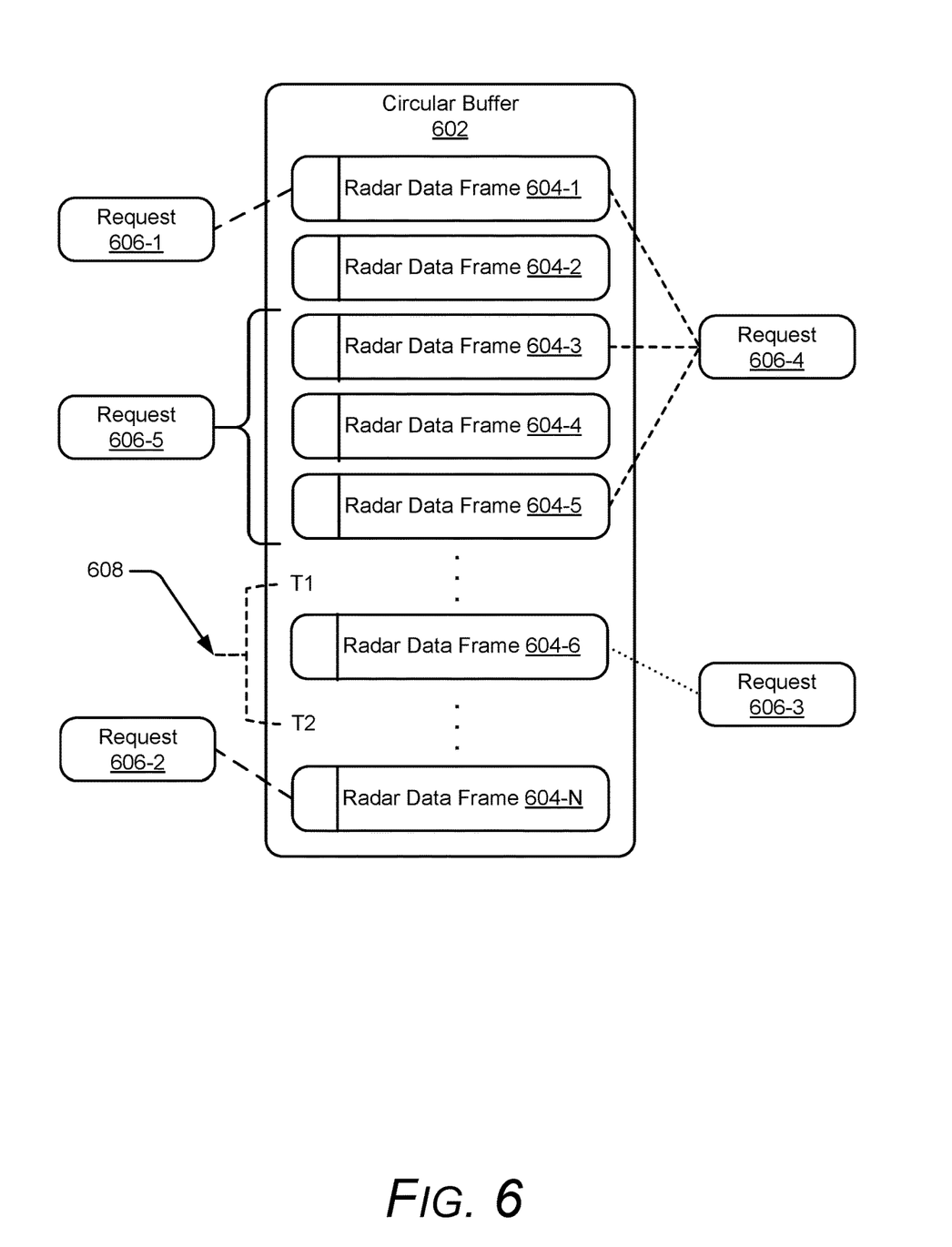
FIG. 6 illustrates additional details of the method of FIG. 6 in the context of another example implementation of the circular buffer.

FIG. 6 illustrates another example implementation 602 of the circular buffer 112 that includes current radar data frames 604-1 through 604-N and receives example application requests 606-1 through 606-5. In the example circular buffer 602, each current radar data frame 604 includes a radar data portion and a header data portion as described with reference to FIG. 3. Further, the current radar data frame 604-1 is the oldest radar data frame and the current radar data frame 604-N is the latest. Assume that the request 606-1 includes a characteristic of the radar data frame. The data manager 216 can determine (e.g., based on information in the header data portion of the radar data frames 604) that the current radar data frame 604-1 includes the characteristic and thereby determine that the current radar data frame 604-1 corresponds to the radar data frame application request 606-1. Similarly, assuming that the request 606-2 includes a request for a latest radar data frame written to the example circular buffer 602, the data manager 216 can use the information in the header data portions of the radar data frames 604 to determine that the current radar data frame 604-N is the latest radar data frame and thereby determine that the current radar data frame 604-N corresponds to the radar data frame requested in request 606-2.

Continuing with the example of FIG. 6, assume that the data manager 216 has analyzed example requests 606-3, 606-4, and 606-5 as described with reference to FIG. 5. Further assume that the analysis of the request 606-3 determined a timing window for the requested radar data frame, the analysis of the request 606-4 determined a radar data frame interval for the requested radar data frame, and that the analysis of request 606-5 determined a requested group of consecutive radar data frames.

The data manager 216 can use the information in the radar data portions and/or the header data portions of the radar data frames 604 to determine that the current radar data frame 604-6 is within the determined timing window. For example, assume the determined timing window is an interval 608 that extends from a time T1 to a time T2 and that the current radar data frame 604-6 is the only current radar data frame 604 that is within the window. With this information, the data manager 216 can determine that the current radar data frame 604-6 is within the timing window and thus corresponds to the radar data frame requested in the request 606-3.

In a similar manner, the data manager 216 can determine that the current radar data frames 604-1, 604-3, and 604-5 occur at the determined radar frame interval. For example, assume that the determined radar frame interval determined for request 606-4 is one minute and that the current radar data frames 604-1 through 604-5 were written 30 seconds apart. With this information, the data manager 216 can determine that the current radar data frames 604-1, 604-3, and 604-5 occur at the radar data interval (that is, they are one minute apart) and thus correspond to the radar data frames requested in the request 606-4.

The data manager 216 can also determine that a current radar data frame 604 is one radar data frame of the group of consecutive radar data frames. For example, using information in the radar data portion and/or the header data portion of the current radar data frames 604, the data manager 216 can determine that the current radar data frames 604-3, 604-4, and 604-5 are a group of consecutive radar data frames. The data manager 216 can then use the determination of a consecutive group to determine that any one of the current radar data frames 604-3, 604-4, and 604-5 is one radar data frame of the determined consecutive group and thus corresponds to the radar data frame requested in the request 606-5.

Returning now to FIG. 5, at 506, the application is caused to read the current radar data frame stored in the circular buffer before the current radar data frame is overwritten. The application may be caused to read the current radar data frame by any of a variety of devices, such as the data manager 216 described above. For example, the data manager 216 may cause the application to read the current radar data frame by providing an address of the current radar data frame to the application. The application can then read the radar data frame in the normal course of operation. As noted, however, a circular buffer (e.g., the circular buffer 112) has a fixed size, and when data has been written to all the addresses in the circular buffer, the next data element will be written to the address with the oldest data. In some implementations, therefore, the data manager 216 may cause the application to read the current radar data frame by sending a hardware interrupt to the application, which forces the application to read the radar data frame. As described herein, the hardware interrupt may be sent instead of, or in addition to, the sending of the address of the current radar data frame.

Through the techniques described above, the radar-based data collection system 106 can receive requests from one or more applications to read radar data frames from a circular buffer memory. The radar-based data collection system 106 can determine which of the stored radar data frames correspond to radar data frames requested by the applications and cause the applications to read the radar data frames that correspond to the requests. In this way, the radar-based data collection system 106 can enable simultaneous real-time access to radar data for applications that use radar data in their operations.

Figure 7:
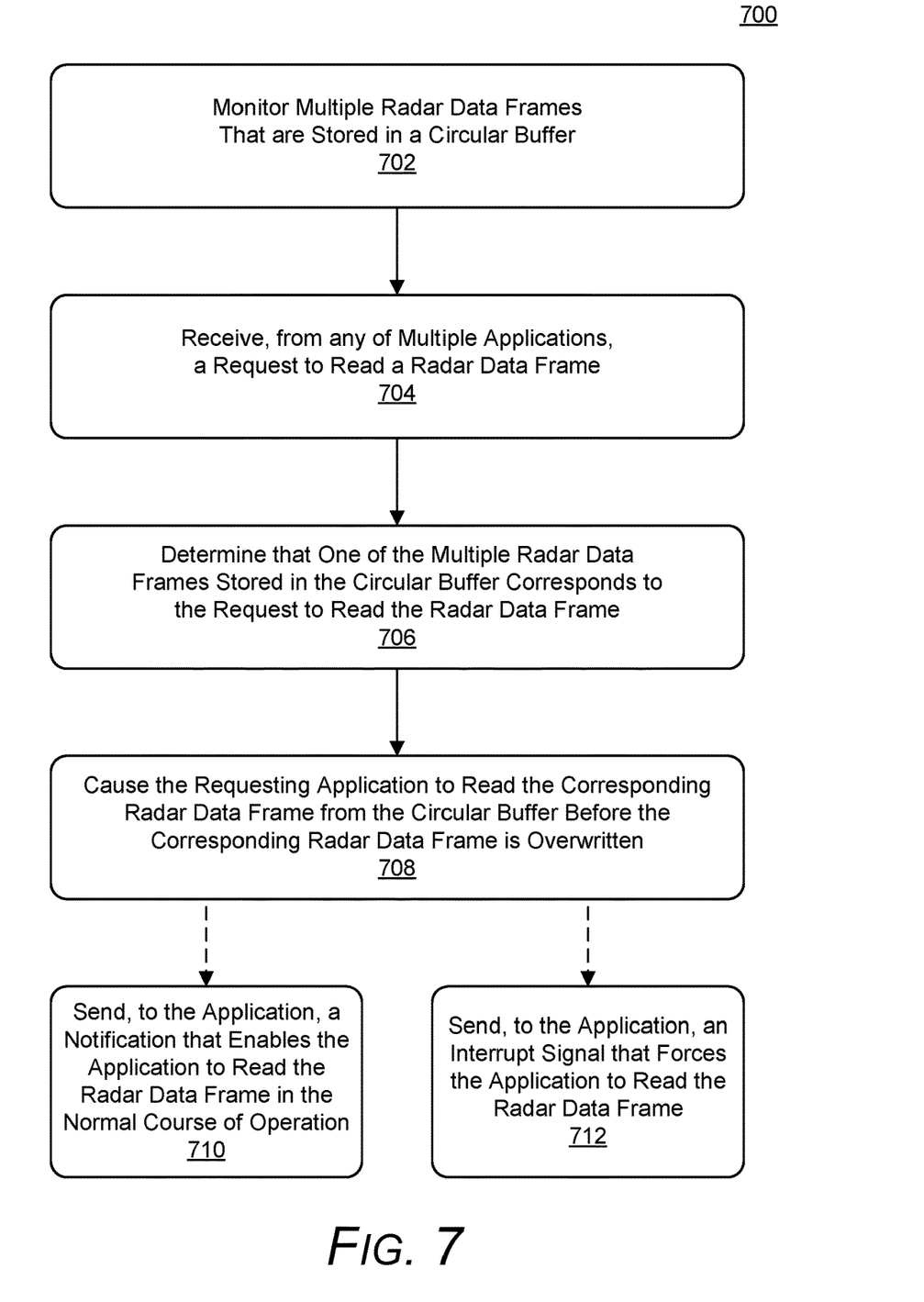
FIG. 7 illustrates another example method enabling access to high frame-rate radar data via a circular buffer.

FIG. 7 illustrates another example method 700 that enables access to high frame-rate radar data via a circular buffer. The example method 700 is shown as a set of blocks that specifies operations performed but is not necessarily limited to the order or combinations shown for performing the operations by the respective blocks. Further, any of one or more of the operations may be repeated, combined, reorganized, or linked to provide a wide array of additional and/or alternate methods. In portions of the following discussion, reference may be made to the example environment 100 of FIG. 1 and/or to entities or processes detailed in FIGS. 2-6, reference to which is made for example only. The techniques are not limited to performance by one entity or multiple entities operating on one device.

At 702, multiple radar data frames that are stored in a circular buffer are monitored. The multiple radar data frames may be stored in a circular buffer such as the circular buffer 112 or in another memory. The monitoring may be performed by any of a variety of devices, such as the data manager 216 described herein. For example, the data manager 216 may monitor various aspects of the radar data frames, including information stored in either or both of the radar data portion 308 and the header data portion 310 of the example circular buffer 112 described in FIG. 3.

At 704, a request to read a radar data frame from the circular buffer is received from any one or more of multiple applications. Continuing the example of step 702, the data manager 216 receives a read request from any of the example applications 206 described in FIG. 2.

At 706, one of the multiple radar data frames stored in the circular buffer is determined to correspond to the read request. The determination can be performed by various devices, such as the data manager 216. Additional details of the determination of correspondence are described with respect to FIG. 8.

At 708, the requesting application is caused to read the radar data frame that is determined to correspond to the read request. The application is caused to read the corresponding radar data frame before the corresponding radar data frame is overwritten in the circular buffer. Steps 710 and 712 describe examples of how the data manager 216 can cause the requesting application to read the corresponding radar data frame.

At 710, the data manager 216 sends a notification to the requesting application that the corresponding radar data frame is available to be read. The notification includes the address in the circular buffer of the corresponding radar data frame, which allows the requesting application to read the corresponding radar data frame in the normal course of operation.

At 712, additionally or alternatively to the actions of step 710, the data manager 216 sends an interrupt signal to the requesting application. The interrupt signal forces the application to suspend its current operations and read the corresponding radar frame before resuming other operations. Additional details regarding the interrupt signal are described with respect to FIG. 8.

Figure 8:
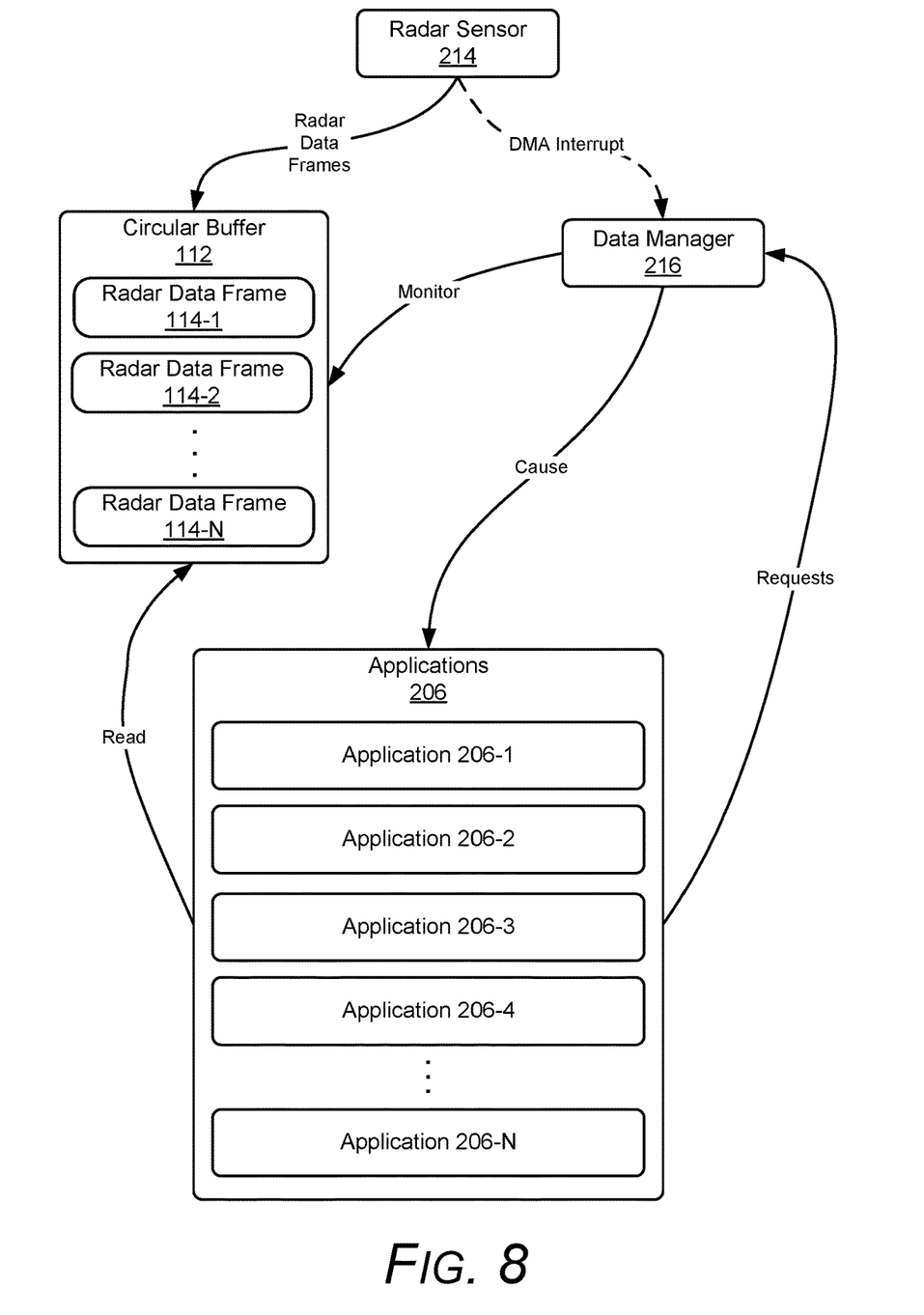
FIG. 8 illustrates additional details of the method of FIG. 7 in the context of an example process.

FIG. 8 illustrates additional details of the method 700 in the context of an example process 800 that can be implemented to enable multiple applications to access multiple radar data frames. In the example process 800, the radar sensor 214 writes multiple radar data frames 114-1 through 114-N to the circular buffer 112. The data manager 216 monitors the multiple radar data frames 114 stored in the circular buffer 112. The data manager 216 can monitor both a radar data portion and a header data portion of the radar data frames 114 (e.g., the radar data portion 308 and the header data portion 310 described in FIG. 3). As noted herein, the radar sensor 214 may write the radar data frames 114 to the circular buffer 112 via DMA. Optionally, as part of the DMA writing process, the radar sensor 214 may send an interrupt signal to the data manager 216 to alert the data manager 216 that a particular radar data frame 114 has been written.

The data manager 216 also receives, from any of the multiple applications 206, a request to read a radar data frame. The data manager 216 then determines that one of the multiple radar data frames 114 stored in the circular buffer 112 corresponds to the request to read the radar data frame. The determination that one of the stored radar data frames 114 corresponds to the requested radar data frames may be achieved using a variety of methods, such as by comparing the radar data frame request to the radar data portion 308 and/or to the header data portion 310 of the radar data frames 114. In some cases, the data manager may receive the request before the radar data frame that corresponds to the request has been written. In these cases, the data manager can store the request (e.g., in the memory 404 described with reference to FIG. 4) and make the determination of correspondence after the requested radar data frame 114 is written.

The data manager 216 then causes the requesting application 206 to read the corresponding radar data frame 114 stored in the circular buffer before the corresponding radar data frame 114 is overwritten by the radar sensor. The data manager 216 can cause the application 206 to read the corresponding radar data frame 114 by sending a notification that the requested radar data frame is in the circular buffer 112 at a particular address, which enables the application 206 to read the radar data frame 114 in the normal course of operations. The data manager 216 may also send an interrupt signal that forces the application 206 to read the radar data frame 114. The interrupt signal may be instead of, or in addition to, the notification. For example, the data manager 216 may send the notification and, if the application 206 does not read the radar data frame 114 within a threshold amount of time, send the hardware interrupt to ensure that the application 206 reads the requested radar data frame 114 prior to the radar data frame 114 being overwritten in the circular buffer 112.

As described herein, the circular buffer 112 may be a multi-port memory that allows simultaneous access by multiple applications and/or devices. Because the DMA process can provide an interrupt (shown as a dashed line in FIG. 8) to alert the data manager 216 that a radar data frame 114 has been written, the data manager 216 can provide real-time, or near-real-time, responses to data requests, even in cases of simultaneous requests for a particular radar data frame 114.

In some implementations, the data manager 216 may also receive, from another application 206, another request to read another radar data frame 114. The other application 206 may process the radar data frame 114 differently from the original application. For example, the data manager 216 may receive a request from the application 206-1, which can be used to detect occluded gestures, and then receive another request from the application 206-4, which can be used identify a three-dimensional context map of a space. Using techniques similar to those described above, the data manager 216 can then determine that another of the multiple radar data frames 114 stored in the circular buffer corresponds to the other request (the request from the application 206-4) and cause the other application (the application 206-4) to read the other radar data frame 114 stored in the circular buffer before the other radar data frame is overwritten. In some implementations, an individual radar data frame 114 can be used by different applications and processed differently for that application's purpose.

Example Application

The described techniques and apparatuses can be paired with machine learning techniques to use radar data and position data to predict direction, movement, and location of target objects detected by a radar sensor. For example, the radar-based data collection system 106 may be used in with a machine learning technique to determine and predict a two-dimensional (2D) or three-dimensional (3D) position of a user's hand. Knowing the 3D (x, y, z) position of the user's hand is the basis for many user interaction systems, such as touch screens, computer mouse devices, gesture recognition systems, and handwriting recognition systems. Radar-based techniques for determining (x, y, z) position allow a user to provide input, such as handwriting gestures, anywhere in space within the sensor's range. The (x, y, z) coordinate determined by the radar sensor can be used by existing handwriting recognition systems as if the user had been pressing their finger or a stylus to a touch screen.

In this example implementation of the radar-based data collection system 106, an application requests, from the data manager 216, radar data frames related to a particular target object. The application also requests, from a position sensor, data that represents the physical position of the target object. The position sensor can be any one or combination of a variety of sensors, such as a capacitive or photoelectric proximity sensor, or an ultrasonic sensor.

The example application takes, as input, sequences of paired data (S, P), in which S is radar data (from the circular buffer 112) and P is data from the position sensor. The example application uses a machine learning model that can be trained, using the (S, P) paired data, to learn how a novel input S can be translated into a corresponding position P. Any of a variety of machine learning models for sequence learning may be used, such as a Hidden Markov Model or a Recurrent Neural Network.

In some implementations, S can be raw data from the radar sensor 214. In other cases, S can be any of a variety of processed data, such as early stage radar data (e.g., magnitude and phase information from a radar return image) or minimally processed radar data (e.g., range-Doppler data, micro-Doppler data, or I/Q data). In some cases, P is data that represents the absolute position of the target object in (x, y, z) coordinates. In other cases, P represents a relative position (x, y, z) that corresponds to movement between a current point and a subsequent point.

The sequences (S, P) may be synchronized, so that there is a direct mapping of each sensor output S to a position P. In other cases, the sequences (S, P) may be only partially synchronized. For example, the sequences may of different lengths when the sampling frequencies of S and P are different, in which case multiple samples from one sequence correspond to one sample from the other sequence. Further, it may sometimes be desirable to predict gestures that are in a particular 2D (x, y) plane along the z-axis or excluded from a particular 2D (x, y) plane along the z-axis. Separate models may therefore be trained for the (x, y) coordinates and the (z) coordinate.

The described implementation can be used to train an application to use radar-based gesture recognition to compute an (x, y) or (x, y, z) position of a user's hand. In this way, a user can interact with computing devices from a distance. For example, the user's handwriting may be recognized from a distance, allowing data (e.g., annotations or a signature) to be input without having to make contact with a touchscreen. In another case, the techniques can enable a user's hand to be recognized as a cursor, allowing a user to unlock the additional functionality that comes from using a cursor, without having to use a touch input.

Example Computing System

Figure 9:
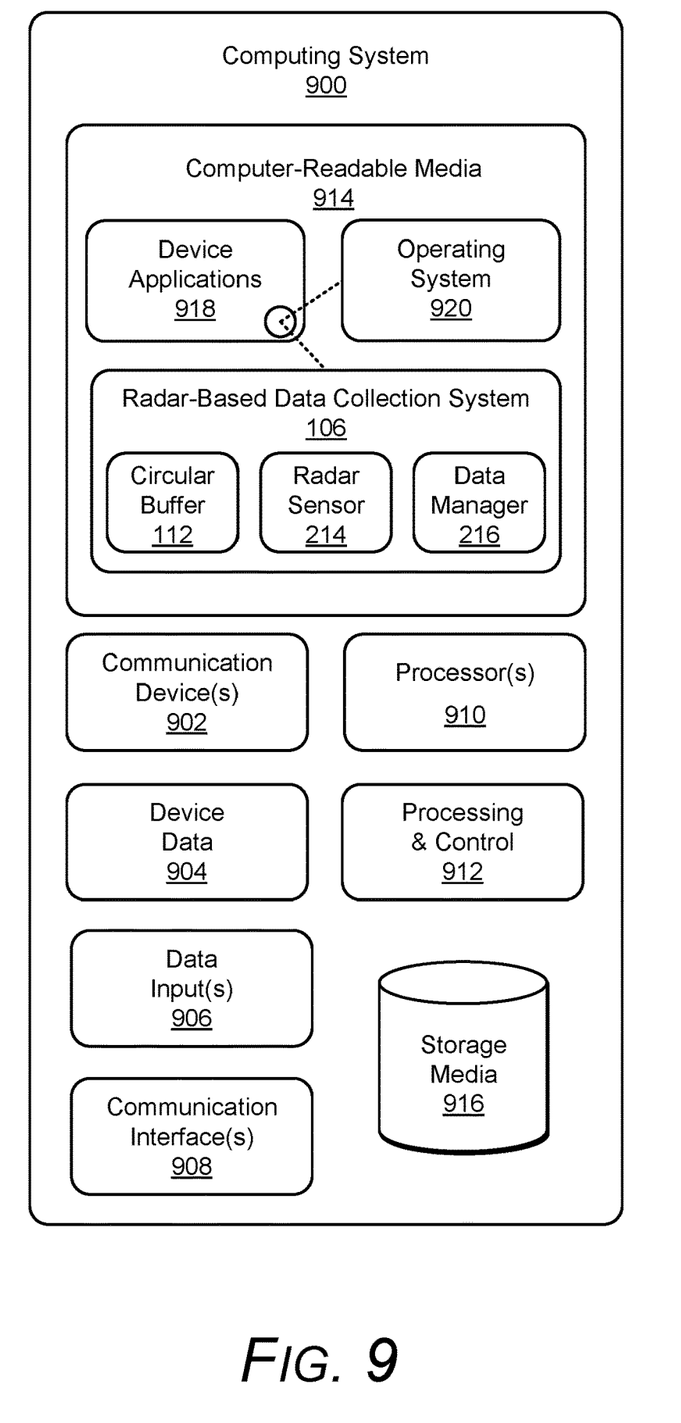
FIG. 9 illustrates an example computing system embodying, or in which techniques may be implemented that enable, access to high frame-rate radar data via a circular buffer.

FIG. 9 illustrates various components of an example computing system 900 that can be implemented as any type of client, server, and/or computing device as described with reference to the previous FIGS. 1-8 to implement access to high frame-rate radar data via a circular buffer.

The computing system 900 includes communication devices 902 that enable wired and/or wireless communication of device data 904 (e.g., radar data, received data, data that is being received, data scheduled for broadcast, data packets of the data, etc.). The device data 904 or other device content can include configuration settings of the device, media content stored on the device, and/or information associated with a user of the device (e.g., an identity of a person within a radar field). Media content stored on the computing system 900 can include any type of audio, video, and/or image data. The computing system 900 includes one or more data inputs 906 via which any type of data, media content, and/or inputs can be received, such as human utterances, interactions with a radar field, user-selectable inputs (explicit or implicit), messages, music, television media content, recorded video content, and any other type of audio, video, and/or image data received from any content and/or data source.

The computing system 900 also includes communication interfaces 908, which can be implemented as any one or more of a serial and/or parallel interface, a wireless interface, any type of network interface, a modem, and as any other type of communication interface. The communication interfaces 908 provide a connection and/or communication links between the computing system 900 and a communication network by which other electronic, computing, and communication devices communicate data with the computing system 900.

The computing system 900 includes one or more processors 910 (e.g., any of microprocessors, controllers, and so forth) that can process various computer-executable instructions to control the operation of the computing system 900 and to enable techniques for, or in which can be embodied, access to high frame-rate radar data via a circular buffer. Alternatively or additionally, the computing system 900 can be implemented with any one or combination of hardware, firmware, or fixed logic circuitry that is implemented in connection with processing and control circuits, which are generally identified at 912. Although not shown, the computing system 900 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 900 also includes computer-readable media 914, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. The computing system 900 can also include a mass storage media device (storage media) 916.

The computer-readable media 914 provides data storage mechanisms to store the device data 904, as well as various device applications 918 and any other types of information and/or data related to operational aspects of the computing system 900. For example, an operating system 920 can be maintained as a computer application with the computer-readable media 914 and executed on the processors 910. The device applications 918 may include a device manager, such as any form of a control application, software application, signal-processing and control module, code that is native to a particular device, an abstraction module or gesture recognition module and so on. The device applications 918 also include system components, engines, or managers to implement access to high frame-rate radar data via a circular buffer, such as the radar-based data collection system 106, including the circular buffer 112, the radar sensor 214, and the data manager 216. The computing system 900 may also include, or have access to, one or more machine learning systems.

CONCLUSION

Although embodiments of techniques for, and apparatuses enabling, access to high frame-rate radar data via a circular buffer have been described in language specific to features and/or methods, it is to be understood that the subject of the appended claims is not necessarily limited to the specific features or methods described. Rather, the specific features and methods are disclosed as example implementations enabling access to high frame-rate radar data via a circular buffer.

What is claimed is:

1. An apparatus comprising:
a pinned memory containing a page locked circular buffer configured to store multiple radar data frames;
a radar sensor configured to write the radar data frames to physical memory addresses of the page locked circular buffer using direct memory access;
a processor; and
a data manager that, when implemented by the processor, is configured to:
monitor the radar data frames stored in the page locked circular buffer;

receive, from an application, a radar data frame interval;

determine that a radar data frame of the radar data frames stored in the page locked circular buffer corresponds to the radar data frame interval;

determine one or more corresponding physical memory addresses of the physical memory addresses of the page locked circular buffer that correspond to the radar data frame; and send the corresponding physical memory addresses that correspond to the radar data frame at the radar data frame interval to the application to direct the application to read the radar data frame from the corresponding physical memory addresses that correspond to the radar data frame before the radar data frame is overwritten.

2. The apparatus of claim 1, wherein the radar sensor is configured to write each of the radar data frames to the corresponding physical memory addresses of the page locked circular buffer at a write interval between 100 microseconds and 100 milliseconds.

3. A method implemented by a computing device, the method comprising:

receiving, by the computing device, a request from an application to read radar data frames at a radar data frame interval;

determining, by the computing device, that a radar data frame stored in a page locked circular buffer within a pinned memory corresponds to the radar data frame interval;

determining, by the computing device, one or more physical memory addresses within the pinned memory that correspond to the radar data frame; and sending, by the computing device, the physical memory addresses that correspond to the radar data frame at the radar data frame interval to the application to direct the application to read the radar data frame from the physical memory addresses that correspond to the radar data frame before the radar data frame is overwritten.

4. The method of claim 3, further comprising receiving an interrupt indicating that a writing of the radar data frame to the page locked circular buffer is complete.

5. The method of claim 3, wherein the physical memory addresses that correspond to the radar data frame are sent to the application as part of an interrupt.

6. A data manager implemented at least partially in hardware, the data manager configured to:

monitor a page locked circular buffer contained within a pinned memory that is communicatively coupled to the data manager, the page locked circular buffer storing multiple radar data frames;

receive, from an application, a radar data frame interval;

determine that a radar data frame of the radar data frames stored in the page locked circular buffer corresponds to the radar data frame interval;

determine one or more physical memory addresses of the pinned memory that correspond to the radar data frame; and send the physical memory addresses that correspond to the radar data frame at the radar data frame interval to the application to direct the application to read the radar data frame from the physical memory addresses that correspond to the radar data frame before the radar data frame is overwritten.

7. The data manager of claim 6, further configured to:

receive, from another application, a request to read another radar data frame;

determine that another radar data frame of the radar data frames stored in the page locked circular buffer corresponds to the request; and send physical memory addresses that correspond to the other radar data frame to the other application to direct the other application to read the other radar data frame from the physical memory addresses that correspond to the other radar data frame before the other radar data frame is overwritten.

8. The data manager of claim 7, wherein the other application is configured to process radar data frames differently than the application.

9. The data manager of claim 6, wherein the radar data frame includes in-phase and quadrature data.

10. The data manager of claim 6, wherein the radar data frame includes range-Doppler data.

11. The data manager of claim 6, wherein the radar data frames includes radar data frames from multiple radar sensors.

12. The apparatus of claim 1, wherein the radar data frame is a most recent radar data frame stored within the page locked circular buffer allowing for real-time access to the radar data frame by the application.

13. The apparatus of claim 1, wherein the apparatus is comprised by a mobile device.

14. The apparatus of claim 2, wherein the radar data frame interval is greater than the write interval.

15. The apparatus of claim 1, wherein the radar data frame is a most-recent radar data frame stored within the page locked circular buffer allowing for real-time access to the radar data frame by the application.

16. The apparatus of claim 1, wherein the corresponding physical memory addresses that correspond to the radar data frame are sent to the application as part of an interrupt.

17. The method of claim 3, wherein the radar data frame interval is greater than an interval of radar data frames within the page locked circular buffer.

18. The method of claim 3, wherein the radar data frame contains at least one of in-phase and quadrature data or range-Doppler data.

19. The data manager of claim 6, wherein the physical memory addresses that correspond to the radar data frame are sent to the application as part of an interrupt.

20. The data manager of claim 6, further configured to:

receive, from the application or another application, a request corresponding to the radar data frames;

determine that another radar data frame of the radar data frames stored in the page locked circular buffer corresponds to the request;

determine other physical memory addresses of the pinned memory that correspond to the other radar data frame; and send the other physical memory addresses that correspond to the other radar data frame to the application or other application to direct the application or other application to read the other radar data frame from the physical memory addresses that correspond to the other radar data frame before the other radar data frame is overwritten.

* * * * *